Patented June 16, 1925.

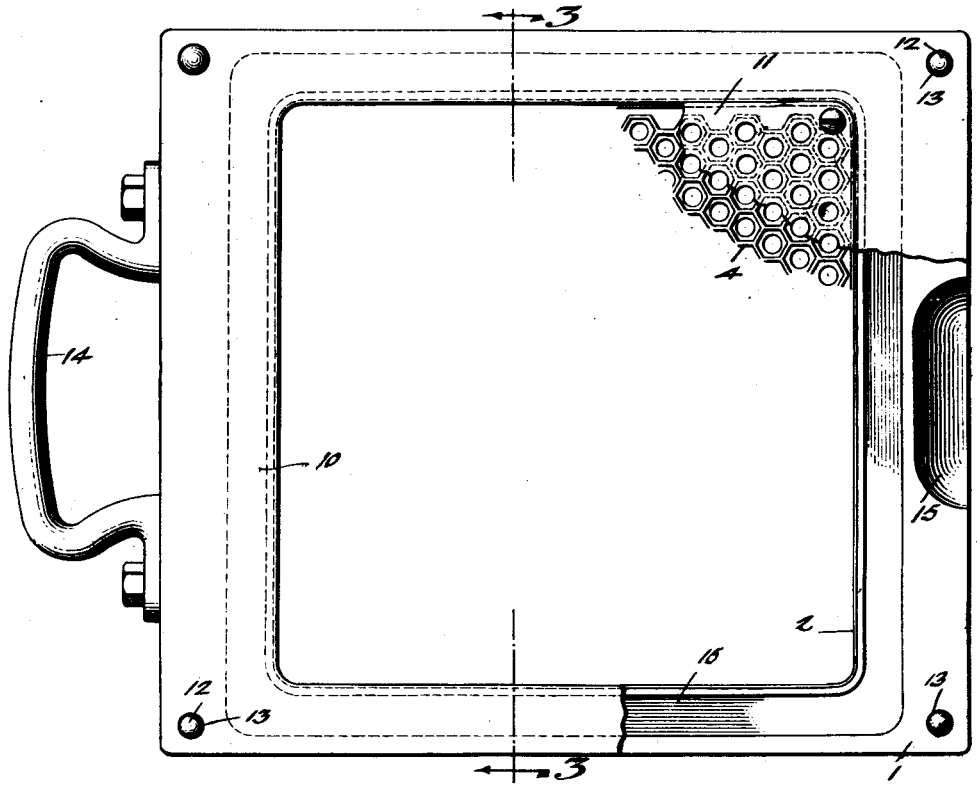
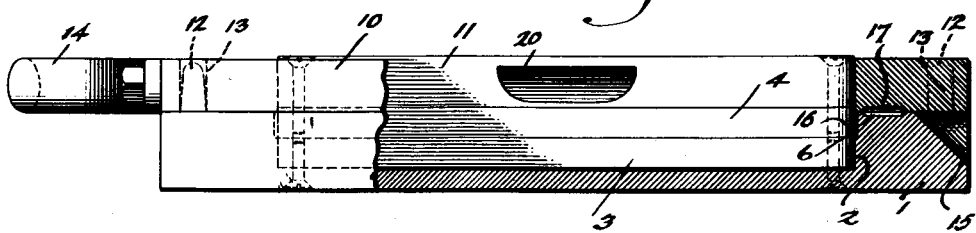
Fig. 1
Fig. 2

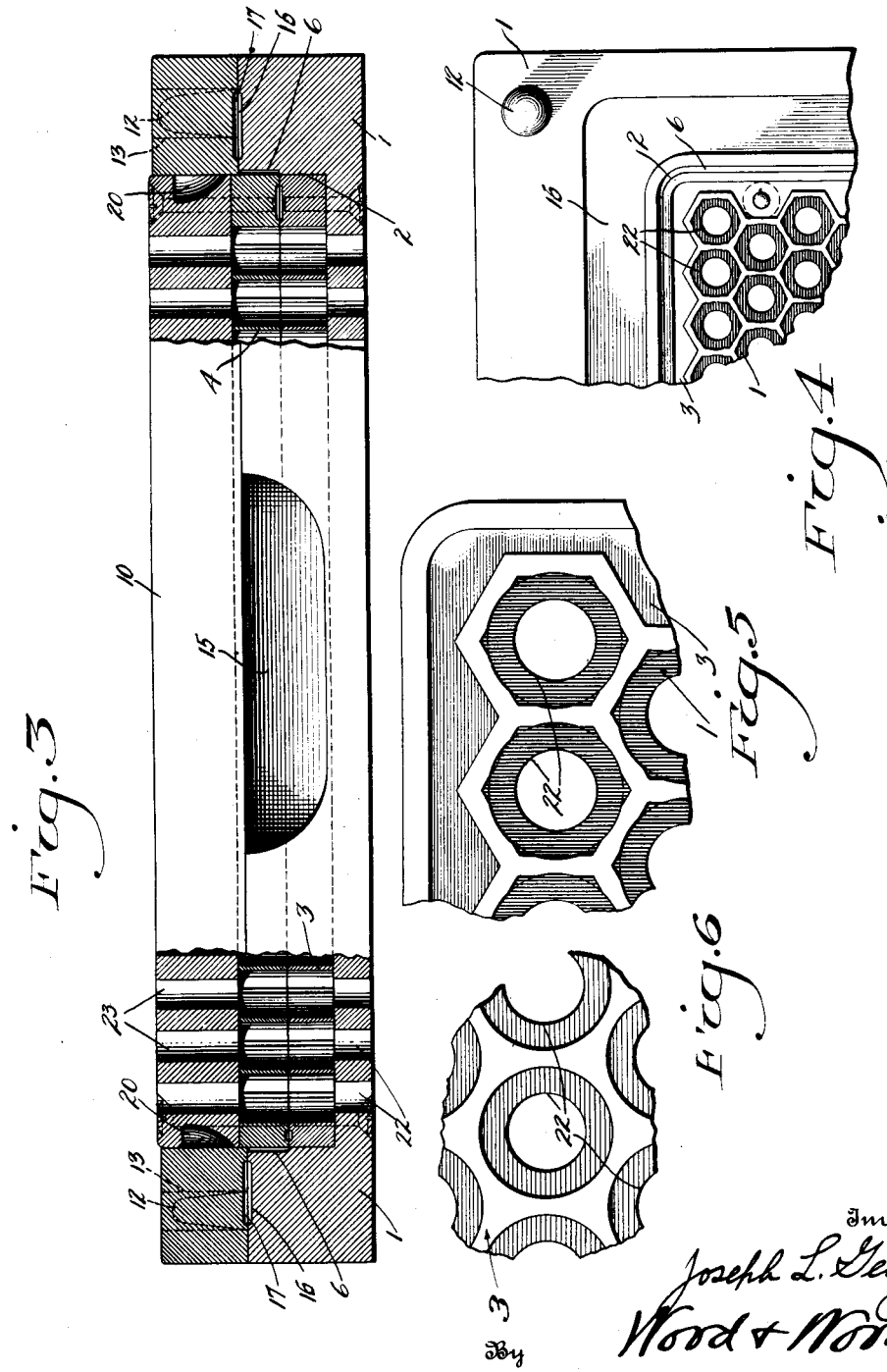

1,541,939

UNITED STATES PATENT OFFICE.

JOSEPH L. GEORGE, OF CINCINNATI, OHIO.

CAPSULE MOLD.

Application filed December 13, 1924. Serial No. 755,800.

*To all whom it may concern:*

Be it known that I, JOSEPH L. GEORGE, a citizen of the United States, and residing at Cincinnati, in the county of Hamilton and State of Ohio, have invented a new and useful Improvement in Capsule Molds, of which the following specification is a full disclosure.

This invention relates to improvements in capsule molds wherein a filling material, such as medicine or confection, is placed between films or sheets of gelatin or other suitable covering substance, and pressure applied to force the gelatin sheets and contained filling material into the mold cavity, to compressibly cement the meeting surfaces of the sheets between the cavities and about the filling material, simultaneously forming a sheet of connected substantial spherical capsules which may be conveniently separated. The molds are primarily adaptable in the manufacture of coloring capsules for coloring oleomargarine.

As herein shown, the mold comprises a base member as a receptacle for holding the two mold sections and contained material, each section being of honeycomb formation and the mold cavities as openings being registerable to form a plurality of continuous openings or cells when the sections are brought toward one another.

An object of the invention is to obtain the largest possible number of cells or mold cavities for a given dimension or area of mold section, this object being accomplished by shaping the cavities in a manner to permit of closer relative spacing, thereby obtaining reduced wall thickness between adjacent cavities and at the same time maintaining wall rigidity. By reducing the wall thickness, the areas of the connective web or fin portions between adjacent capsules are also reduced, providing for freer separation of the capsules and no waste of gelatin due to the fins. This arrangement obtains a considerable saving in capsule covering material, and yet permits of the formation of a capsule having a substantial circular contour.

The above objects are accomplished by a honeycomb formation and arrangement of the cells of the mold sections, said cells having hexagonal or circular form, thus providing sufficient thickness in metal between adjacent cavities to obtain a rigid structure. Each cavity is bored, the bore twice intersecting each side of the cell or cavity to form segmental circular depressions having a common radius, the center of which lies in the long axis of the cell. The wall thickness is thus reduced, without sacrifice of wall strength, and cell area is increased.

Other objects and certain advantages will appear in the description of the drawings, forming a part of this application, and in said drawings:

Figure 1 is a plan view of the mold with a portion of the guide frame removed to show the channel in the upper surface of the lower mold element.

Figure 2 is a vertical sectional elevation.

Figure 3 is an enlarged sectional elevation on line 3—3, of Fig. 1.

Figure 4 is a fragmentary detailed plan view of the mold with the guide frame removed.

Figure 5 is an enlarged fragmentary view illustrating the cell structure of one of the mold elements.

Figure 6 is a fragmentary plan illustrating how the cells may be formed entirely by boring.

The mold section comprises a base member 1, rectangularly recessed as at 2 for the reception of the lower and upper mold elements or sections 3, 4. The lower element 3 is adapted to fit snugly within the bottom portion of the cavity, said element being fastened within the cavity by screws as shown. The cavity 2 is counter-recessed as at 6, to provide clearance for the sheet capsule-covering material between the side of mold section 4 and the cavity 2, as hereinafter more fully explained. Mounted upon the top of the base 1 is a rectangular frame 10 as a guide for the follower member 11, said member adapted to be placed upon the top of and attached to the upper mold section as a thrust-receiving compression member, for forcing the mold sections together, and for removing said upper section.

The frame 10 is held centered by the pins 12, carried by the base member 1, which pins engage openings 13 of the said frame. The frame is further provided at one side with a handle 14, and the base member 1 is recessed, as at 15, to permit the hand to engage the underside of said frame for lifting.

The base 1 and follower member 11 are provided with vent openings 22, 23, one for each cell, the axes of said openings and cells being aligned when the mold is assembled.

The base member 1 and frame or follower member 11 are provided with opposing grooves 16, 17, respectively in the upper surface of the base 1 and lower surface of the frame 11 for the reception of the outer edges of the gelatin sheets, during the molding operation. The follower member 11 is provided with kerfs 20 as handholds for lifting.

My improved mold sections 3, 4 are identical in cell formation and cell relation, and corresponding cells or openings are adapted to register when the sections are brought together. The cell formation and arrangement is that of a honeycomb, the cells being of regular hexagonal or circular configuration and alternately arranged as shown in detail in Figs. 4 and 5. In forming a section, the honeycomb structure is obtained in any suitable manner, the material preferably being non-corrosive. After formation, each cell is bored, the boring tool being centered with respect to the long axis of the cell and the tool circumference intersecting each cell wall at two points, forming circular cupped areas as grooves. The cells, may, however, be formed entirely by boring.

In using the mold, the section 3 is first placed in the base 1 and a sheet of covering material, generally of gelatinous nature, is laid upon the section, the edges of the sheet turned upwardly and laid over the base 1 and extended into the groove 17. The filling material, as medicament or confection, is then poured upon the sheet in predetermined quantity sufficient to form a capsule of the required size, and a second sheet is laid upon the filling material, and its edges similarly turned, as for the first sheet, and laid in the groove 17. The upper mold section 4 is then placed in position upon the upper gelatin sheet. After placing the frame 10 upon the top of the base 1, with its openings 13 registering with the pins 12, the follower block 11 is introduced in the frame opening and is forced against the upper mold member 4. When all sections have been properly placed, as above described, pressure is submitted to the follower 11, and the mold sections are forced together to form substantial spherical capsules.

A reduction of wall thickness is especially desirable at the corners of the cells, or at such portion where the fin surface between the cells would be of an area which would permit the capsules to adhere to one another. The walls at such corners may be notched to throw the material into the body of the capsule so that the fin between the capsule is easily torn for capsule separation without leaving a mat of gelatin from which, as now practised, the capsule must be individually removed, and the mat left as residue or waste. While such mold structure may develop an irregular capsule contour the projections are very minute and are only recognized upon close observation. The flabby nature of the capsule immediately after molding and the pressure of the material enclosed by the capsule covering causes it to assume a natural spherical form.

Having described my invention, I claim:

1. A plural cavity mold section, having dividing walls defining regular polygonal shaped openings, each wall of each opening being cupped midway between its junction with adjacent walls.

2. A mold section of honeycomb structure, each cell as an opening through the section and of regular hexagonal configuration, each wall of each cell having a circular depression midway thereof and longitudinally, the depressions of each cell as segments of a circle having its center in the long axis of the cell.

3. A capsule mold, comprising mold sections having mold cavities therein arranged in honeycomb formation, each cell having regular hexagonal walled interior configuration and each wall having a cupped area therein longitudinally thereof, the configuration of said cupped areas being circular and having a common radius centered in the long axis of the cell.

4. A capsule mold comprising container and opposingly related mold sections, each having hexagonal cells therein arranged in honeycomb formation, the cells of one element registerable with companion cells of the other to form continuous openings through the elements, each wall of each opening circularly cupped midway thereof, the configuration of said cupped areas as segments of a circle having its center in the long axis of the cell.

5. A capsule mold comprising a container and opposingly related mold sections, each having hexagonal openings therethrough in honeycomb formation, the openings of each section registerable with companion openings to form continuous openings through the two sections, and each wall of each opening having a circular depression midway thereof, said segmental circular depressions as segments of a circle having its center in the long axis of the opening.

6. A capsule mold comprising parting mold sections, one section thereof containing mold cells with the walls rectilinear at the parting surface of said mold and junction of a group of adjacent cells.

In witness whereof, I hereunto subscribe my name.

JOSEPH L. GEORGE.